(12) United States Patent
Zawadzki et al.

(10) Patent No.: US 9,221,086 B2
(45) Date of Patent: Dec. 29, 2015

(54) SHEAR FOR SHEARING PRODUCTS AND ASSOCIATED PRODUCTION PROCESS

(75) Inventors: Michal Zawadzki, Manzano (IT); Marco Di Giacomo, Cormons (IT)

(73) Assignee: Danieli & C. Officine Meccaniche S.P.A., Buttrio (IT)

( * ) Notice: Subject to any disclaimer, the term of this patent is extended or adjusted under 35 U.S.C. 154(b) by 339 days.

(21) Appl. No.: 13/825,299

(22) PCT Filed: Sep. 29, 2011

(86) PCT No.: PCT/EP2011/066974
§ 371 (c)(1), (2), (4) Date: Mar. 20, 2013

(87) PCT Pub. No.: WO2012/041954
PCT Pub. Date: Apr. 5, 2012

(65) Prior Publication Data
US 2013/0186159 A1    Jul. 25, 2013

(30) Foreign Application Priority Data
Sep. 30, 2010  (IT) .............................. MI2010A1798

(51) Int. Cl.
| C22C 38/24 | (2006.01) |
| C21D 9/22 | (2006.01) |
| B21B 15/00 | (2006.01) |
| B23D 35/00 | (2006.01) |
| B21K 23/00 | (2006.01) |

(52) U.S. Cl.
CPC ............. *B21B 15/0007* (2013.01); *B21K 23/00* (2013.01); *B23D 35/001* (2013.01); *C21D 9/22* (2013.01); *C22C 38/24* (2013.01)

(58) Field of Classification Search
None
See application file for complete search history.

(56) References Cited

U.S. PATENT DOCUMENTS

| 3,295,401 A | | 1/1967 | Rackoff | |
| 4,036,640 A | * | 7/1977 | Philip | C22C 38/22 420/102 |
| 6,478,898 B1 | * | 11/2002 | Sera | C21D 1/25 148/500 |
| 2005/0155674 A1 | * | 7/2005 | Johansson | C21D 1/18 148/334 |
| 2009/0123322 A1 | * | 5/2009 | Barbosa | C21D 8/005 420/37 |

FOREIGN PATENT DOCUMENTS

| EP | 0216225 | 4/1987 |
| JP | H8-81739 | 3/1996 |

OTHER PUBLICATIONS

Metals Handbook, Tenth Edition, vol. 1, pp. 757-759, ASM International, 1990.*
International Search Report and Written Opinion for International Application No. PCT/EP2011/066974; 9 Pages.

* cited by examiner

*Primary Examiner* — George Wyszomierski
(74) *Attorney, Agent, or Firm* — Stetina Brunda Garred & Brucker

(57) ABSTRACT

Rolling mill shear provided with at least one blade having characteristics of toughness and resistance to thermal shock typical of the family of tool steels for hot shearing and at the same time having sufficiently high characteristics of surface hardness and wear resistance, typical of tool steels for cold shearing. This shear is particularly suitable for carrying out, with greater efficiency and for a longer time, relative to the known shears, the shearing of sections or bars at a temperature between 150 and 800° C., downstream of the Quenching & Tempering heat treatment thereof.

4 Claims, 1 Drawing Sheet

SHEAR FOR SHEARING PRODUCTS AND ASSOCIATED PRODUCTION PROCESS

FIELD OF THE INVENTION

The present invention relates to a shear for shearing long rolled products, in particular suitable for performing shearing directly at the exit of the quenching and tempering (Q&T) zone.

PRIOR ART

Currently, for shearing long rolled products in an intermediate temperature range, i.e. classifiable above the cold shearing temperature (therefore above 150° C.) and at the same time below the hot shearing temperature (that is, below 800° C.), in particular with the surface of the rolled product tending towards the lower limit of the temperature range and its interior tending towards the upper limit, various types of tool steels are used for making the blades of the shears which, however, are not sufficiently robust and therefore constitute the weak link from the standpoint of performance of the chain composed of the various shears present in a rolling mill. This weak link necessitates frequent stopping of the rolling mill merely for replacing the blades of the shears in question, involving appreciable extra maintenance costs and lost production in all cases when it occurs outside of the programmed stops.

Moreover, it is important to bear in mind that in the temperature range 150-800° C. the temperature variation itself causes notable variation of the Maximum Unit Load (MPa) of the sheared material and consequently of the wear rate of the blade itself as a function of its hardness, as well as a notable variation of the energy transmitted through it for performing the shearing.

Currently, in rolling mills, the shears for shearing at intermediate temperatures downstream of the Quenching & Tempering Box (QTB), suitable for carrying out the quenching and tempering treatment of the rolled material and located upstream of the cooling plate, envisage:

the use of blades made of tool steels for cold shearing, which by a heat treatment with tempering at about the secondary hardness peak (referring to the tempering diagrams for steel) make it possible to obtain the maximum toughness of the material at the expense of a relatively small loss of hardness and consequent loss of wear resistance. These blades, despite tempering at around the secondary peak, display high wear resistance but are unable to withstand thermal shock and, when used in the lower temperature ranges, their toughness often becomes insufficient for performing shearing, in particular of more substantial thicknesses. These effects lead to the formation of deep surface cracks, which compromise further use of the blade and cause breakage thereof;

or the use of blades made of tool steels for hot shearing, which after undergoing the standard heat treatment envisaged for this category display high toughness, sufficient even for performing cold shearing of substantial thicknesses, and good resistance to thermal shock, but conversely possess a lower wear resistance than the aforementioned steels and are too soft and are therefore liable to marking by the sheared bar.

The differences between the two types of blades mentioned above are due to the different concentrations of carbon and chromium which, in the case of tool steels for cold shearing, are higher and therefore make it possible to obtain, after heat treatment near the secondary hardness peak, higher values of hardness and wear resistance. Secondly, the higher concentrations of molybdenum, combined with a decrease in carbon concentration, make it possible for blades made of tool steels for hot processing to achieve greater toughness and improved heat resistance.

In conclusion, it may be stated that, from the operational standpoint, the use of tool steels for cold shearing, even if they display good wear resistance, requires premature blade replacement owing to the cracks that form on the cutting edge of the blade itself; while the use of tool steels for hot shearing, even if they are characterized by satisfactory toughness and resistance to thermal shock, leads to marks on the cutting surfaces of the blade and rapid dulling of the cutting edge on account of the low hardness, and therefore rapid wear. Moreover, the use of blades made of tool steels for cold shearing does not allow cooling of the blade itself when said cooling is envisaged.

There is therefore a need for a shear that makes it possible to overcome the aforementioned drawbacks.

SUMMARY OF THE INVENTION

The main aim of the present invention is to devise a shear that is provided with at least one blade having characteristics of toughness and resistance to thermal shock typical of the family of tool steels for hot shearing and at the same time having sufficiently high characteristics of surface hardness and wear resistance, typical of tool steels for cold shearing.

Another aim of the invention is to devise a shear which, in a rolling line for long products, is capable of performing, with greater efficiency and for a longer time, relative to the known shears, the shearing of sections or bars downstream of their Quenching & Tempering thermal treatment, with a temperature of the sections or bars between 150 and 800° C.

A further aim of the invention is that of providing an associated production process for a blade of shear that enables the aforementioned results to be achieved.

The present invention therefore proposes to achieve the aims discussed above by providing a rolling mill shear which, according to claim 1, comprises at least one blade made of steel whose chemical composition, in mass percentage, consists of carbon 0.45-0.55%, silicon 0.10-0.30%, manganese 0.20-0.50%, chromium 4.00-5.50%, molybdenum 2.00-3.00%, vanadium 0.45-0.65%, the remainder being iron and inevitable impurities, and whose microstructure is composed of tempered martensite.

A second aspect of the present invention envisages a production process for the blade of a shear which, according to claim 4, comprises the following stages:

providing a first ingot of steel whose chemical composition, in mass percentage, consists of carbon 0.45-0.55%, silicon 0.10-0.30%, manganese 0.20-0.50%, chromium 4.00-5.50%, molybdenum 2.00-3.00%, vanadium 0.45-0.65%, the remainder being iron and inevitable impurities;

providing Electroslag Remelting of said first ingot and obtaining a second newly solidified ingot;

providing rolling of said second ingot until a blade blank is obtained having a predetermined shape;

providing a quenching cycle consisting in heating the blade to the austenitizing temperature of the steel, comprised between 1035 and 1055° C., by means of two preheating steps at intermediate temperatures respectively equal to 590-610° C. and 840-860° C., and then cooling the blade under vacuum to room temperature;

providing three tempering cycles at temperatures between 510° C. and 550° C.

The shear and the process of the invention allow to the following advantages:

increase in the service life of the blades or knives by a factor of about 5 on bar of small diameter (about 16 mm) and by a factor of about 2.5 on bar of large diameter (from about 25 mm to 32 mm);

reduction in the number of stoppages of the rolling mill for blade changing, and hence reduction in relative costs for lost production, blade replacement, etc.

After long, painstaking research, the material used for making the blades of the shear of the present invention has a carbon content similar to that of tool steels for cold shearing (about 0.5%), currently used in rolling mill shears, in conjunction with the following amounts and characteristics of the alloying elements typical of tool steels for hot shearing:

a reduced amount of manganese (Mn less than 0.5%) relative to steels for cold shearing, in order to increase the hardness after quenching at the expense of a reduction in elasticity of the material;

reduced amount of silicon (Si less than 0.3%) relative to steels for cold shearing, in order to reduce the decrease in wear resistance and resilience;

amounts of chromium (Cr about 5%) equal to those currently used in steels for application in shear blades in order to maintain adequate toughness;

increased amount of molybdenum (Mo greater than or equal to 2.0%) relative to steels for cold shearing, for the purpose of facilitating the formation of molybdenum carbides, increasing the wear resistance, mechanical properties and heat resistance;

presence of vanadium (V about 0.55%) that advantageously promotes the formation of vanadium carbides that are very fine and extremely hard (about 2000 HV), which further improves the wear resistance and refines the microstructure, so that the cutting edge can be kept sharp for longer.

The dependent claims describe preferred embodiments of the invention.

BRIEF DESCRIPTION OF THE DRAWINGS

Further characteristics and advantages of the invention will become clearer from the detailed description of a preferred, but not exclusive, embodiment of a shear, illustrated as a non-limiting example, with the aid of the appended sheets of drawings in which.

DETAILED DESCRIPTION OF A PREFERRED EMBODIMENT OF THE INVENTION

A preferred embodiment of a shear according to the present invention comprises at least one blade made of a steel having the following chemical composition in mass percentage:

| C % | Si % | Mn % | Cr % | Mo % | V % |
|---|---|---|---|---|---|
| 0.45-0.55 | 0.10-0.30 | 0.20-0.50 | 4.00-5.50 | 2.00-3.00 | 0.45-0.65 | the remainder being iron and inevitable impurities.

The production process of a blade or knife of said shear, made of the aforementioned steel, advantageously comprises the following stages:

melting of a metallic charge having the aforementioned composition and pouring the molten material into an ingot mould, followed by solidification of the molten material, forming a first ingot;

Electroslag Remelting (ESR) of said first ingot, by means of a moving ingot mould, for the purpose of removing the slag and further increasing the uniformity of the microstructure of a newly solidified second ingot;

rolling of said second ingot to obtain a blank from which the blade having a predetermined shape is made, with a thickness less than or equal to about 60 mm;

a quenching cycle consisting of heating the blade to the austenitizing temperature of the steel, about 1035-1055° C., by means of two preheating steps at intermediate temperatures respectively equal to 590-610° C. and 840-860° C., and subsequent cooling under vacuum to room temperature at a cooling rate between 10 and 12° C./s;

three tempering cycles at temperatures between 510° C. and 550° C., which give a microstructure composed entirely of tempered martensite and having a hardness Of 56-58 HRC.

Figure 1:
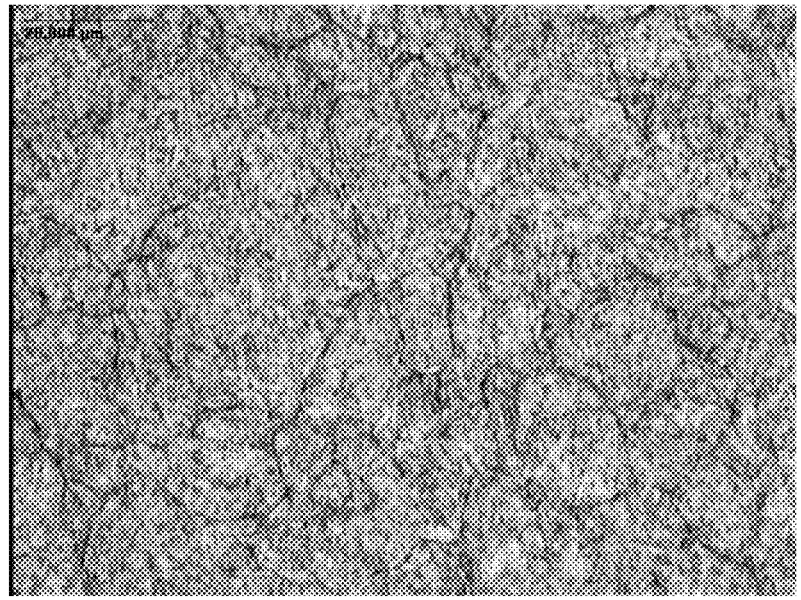
FIG. 1 shows an image of the surface microstructure of a shear blade according to the present invention.
Figure 2:
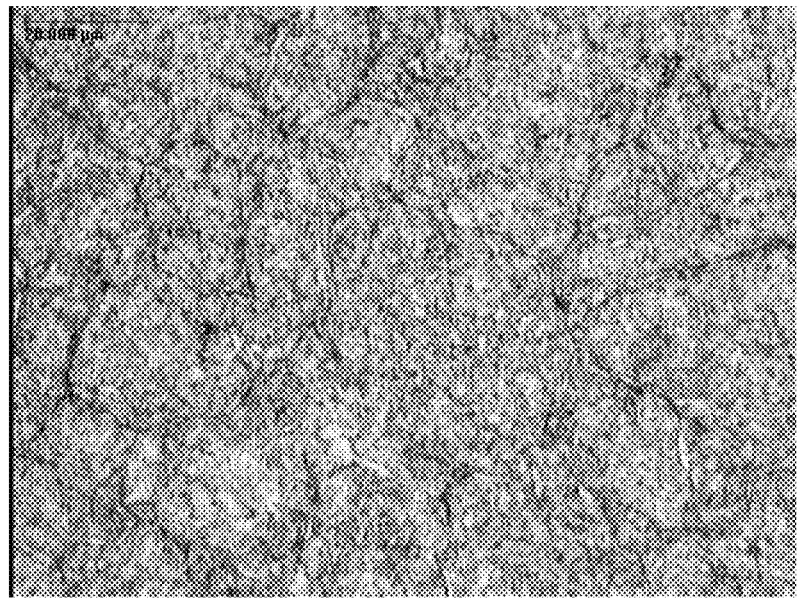
FIG. 2 shows an image of the microstructure corresponding to the innermost zone of the thickness of a shear blade according to the present invention.

FIGS. 1 and 2 show an image of the microstructure of the shear blade, respectively at the surface and at the innermost zone or heart of the blade. It can be seen that the two images are extremely similar: this signifies that there has been full penetration of quenching, both at the surface and in depth. The thickness of the blades of the shear of the present invention is less than or equal to about 60 mm.

The steel selected has characteristics of toughness better than are currently employed in the field of shear blades for use in rolling mills, at the exit from the quenching and tempering machine for rolled products when the latter have temperatures between 150 and 800° C.

Experimental Results

The shear according to the invention was arranged and actuated at the exit of the rolled products from the quenching and tempering machine, provided in the rolling mill, when said products have temperatures between 150 and 800° C. The shear is advantageously arranged downstream of said quenching and tempering machine and upstream of the cooling plate or bed. In a particular variant the shear is arranged immediately downstream of the quenching and tempering machine without further intermediate devices between said quenching and tempering machine and said shear.

The shear of the invention provided extremely surprising results, well beyond what was estimated in the phase of research and development.

EXAMPLE 1

For making the blades of the shear, a first steel was selected having the following preferred chemical composition, in mass percentage,

| C % | Si % | Mn % | Cr % | Mo % | V % |
|---|---|---|---|---|---|
| 0.46 | 0.26 | 0.25 | 4.50 | 3.00 | 0.57 | the remainder being iron and inevitable impurities. The aforementioned steel was submitted to a process comprising the following stages:

melting of a metallic charge having the aforementioned composition and pouring the molten material into an ingot mould, followed by solidification of the molten material, forming a first ingot;

Electroslag Remelting of said first ingot, using a moving ingot mould, for the purpose of removing the slag and further increasing the uniformity of the microstructure of a newly solidified second ingot;

rolling of said second ingot to obtain a blade blank having a maximum thickness equal to about 60 mm;

a quenching cycle consisting of heating the blade to the austenitizing temperature of the steel equal to 1050° C., by means of two preheating steps at intermediate temperatures respectively equal to 600° C. and 850° C., and subsequent cooling under vacuum to room temperature with a pressure of $N_2$ equal to 3.5 bar in order to have an average cooling rate between 10 and 12° C./s;

three successive tempering cycles respectively at temperatures equal to 550° C., 550° C. and 530° C., which allow to obtain a microstructure composed entirely of tempered martensite and having a hardness of 57.1 HRC.

A shear provided with blades made from this specific steel was used for shearing round rolled bars, at the exit thereof from the quenching and tempering machine provided in the rolling mill, said bars being at a temperature of about 620° C.

The results relating to the number of shearings, performed before blade replacement became necessary, are given in the table below in relation to the significant diameter of rolled bars (in millimeters) and compared with the number of shearings performed with a blade made of steel X50CrVMo5-1, belonging to the family of tool steels for cold shearing and typically used in rolling mill shears.

| DIAMETER OF BAR SHEARED | | 16 mm |
|---|---|---|
| NUMBER OF SHEARINGS | blade made of X50CrVMo5-1 (typical material) | 62000 |
| | shear blade of the invention | 301400 |
| | IMPROVEMENT | +486% |

EXAMPLE 2

For making the blades of the shear, a second steel was selected having the following preferred chemical composition, in mass percentage,

| C % | Si % | Mn % | Cr % | Mo % | V % |
|---|---|---|---|---|---|
| 0.48 | 0.24 | 0.25 | 4.30 | 2.90 | 0.59 | the remainder being iron and inevitable impurities. The aforementioned steel was submitted to a process comprising the following stages:

melting of a metallic charge having the aforementioned composition and pouring the molten material into an ingot mould, followed by solidification of the molten material, forming a first ingot;

Electroslag Remelting of said first ingot, using a moving ingot mould, for the purpose of removing the slag and further increasing the uniformity of the microstructure of a newly solidified second ingot;

rolling of said second ingot to obtain a blade blank having a maximum thickness equal to about 60 mm;

a quenching cycle consisting of heating the blade to the austenitizing temperature of the steel equal to 1035° C., by means of two preheating steps at intermediate temperatures respectively equal to 610° C. and 860° C., and subsequent cooling under vacuum to room temperature with a pressure of $N_2$ equal to 3.5 bar in order to have an average cooling rate between 10 and 12° C./s;

three successive tempering cycles respectively at temperatures equal to 540° C., 540° C. and 510° C., which allow to obtain a microstructure composed entirely of tempered martensite and having a hardness of 56.6 HRC.

A shear provided with blades made from this specific steel was used for shearing round rolled bars, at the exit thereof from the quenching and tempering machine provided in the rolling mill, said bars being at a temperature of about 600-650° C.

The results relating to the number of shearings, performed before blade replacement became necessary, are given in the table below in relation to the significant diameter of rolled bars (in millimeters) and compared with the number of shearings performed with a blade made of steel X50CrVMo5-1, belonging to the family of tool steels for cold shearing and typically used in rolling mill shears.

| DIAMETER OF BAR SHEARED | | 25 mm |
|---|---|---|
| NUMBER OF SHEARINGS | blade made of X50CrVMo5-1 (typical material) | 2400 |
| | shear blade of the invention | 6900 |
| | IMPROVEMENT | +287% |

EXAMPLE 3

For making the blades of the shear, a third steel was selected having the following preferred chemical composition, in mass percentage,

| C % | Si % | Mn % | Cr % | Mo % | V % |
|---|---|---|---|---|---|
| 0.48 | 0.22 | 0.24 | 4.35 | 2.85 | 0.58 | the remainder being iron and inevitable impurities. The aforementioned steel was submitted to a process comprising the following stages:

melting of a metallic charge having the aforementioned composition and pouring the molten material into an ingot mould, followed by solidification of the molten material, forming a first ingot;

Electroslag Remelting of said first ingot, using a moving ingot mould, for the purpose of removing the slag and further increasing the uniformity of the microstructure of a newly solidified second ingot;

rolling of said second ingot to obtain a blade blank having a maximum thickness equal to about 60 mm;

a quenching cycle consisting of heating the blade to the austenitizing temperature of the steel equal to 1040° C., by means of two preheating steps at intermediate temperatures respectively equal to 610° C. and 860° C., and subsequent cooling under vacuum to room temperature with a pressure of $N_2$ equal to 3.5 bar in order to have an average cooling rate between 10 and 12° C./s;

three successive tempering cycles respectively at temperatures equal to 540° C., 540° C. and 510° C., which allow to obtain a microstructure composed entirely of tempered martensite and having a hardness of 56.3 HRC.

A shear provided with blades made from this specific steel was used for shearing round rolled bars, at the exit thereof from the quenching and tempering machine provided in the rolling mill, said bars being at a temperature of about 600-650° C.

The results relating to the number of shearings, performed before blade replacement became necessary, are given in the table below in relation to the significant diameter of rolled bars (in millimeters) and compared with the number of shearings performed with a blade made of steel X50CrVMo5-1, belonging to the family of tool steels for cold shearing and typically used in rolling mill shears.

| DIAMETER OF BAR SHEARED | | 32 mm |
|---|---|---|
| NUMBER OF SHEARINGS | blade made of X50CrVMo5-1 (typical material) | 1400 |
| | shear blade of the invention | 4050 |
| | IMPROVEMENT | +289% |

Based on the above examples 1-3, on performing a quantitative analysis that takes into account the reduction in costs for blade changing and the price difference of said blades relative to the solutions currently used, it is to be noted that for the diameters of 32 and 25 mm there is a saving of 50-55% while for the diameter of 16 mm this saving is quantifiable in the order of 60-65%. This evaluation does not take into account the lost production due to blade changing outside of the scheduled stops, which can also be quantified at several hundred thousand euros.

EXAMPLE 4

For making the blades of the shear, a fourth steel was selected having the following preferred chemical composition, in mass percentage,

| C % | Si % | Mn % | Cr % | Mo % | V % |
|---|---|---|---|---|---|
| 0.49 | 0.23 | 0.22 | 4.24 | 2.83 | 0.61 | the remainder being iron and inevitable impurities. The aforementioned steel was submitted to a process comprising the following stages:

melting of a metallic charge having the aforementioned composition and pouring the molten material into an ingot mould, followed by solidification of the molten material, forming a first ingot;

Electroslag Remelting of said first ingot, using a moving ingot mould, for the purpose of removing the slag and further increasing the uniformity of the microstructure of a newly solidified second ingot;

rolling of said second ingot to obtain a blade blank having a maximum thickness equal to about 40 mm;

a quenching cycle consisting of heating the blade to the austenitizing temperature of the steel equal to 1040° C., by means of two preheating steps at intermediate temperatures respectively equal to 610° C. and 860° C., and subsequent cooling under vacuum to room temperature with a pressure of $N_2$ equal to 3.6 bar in order to have an average cooling rate between 10 and 12° C./s;

three successive tempering cycles respectively at temperatures equal to 530° C., 530° C. and 510° C., which allow to obtain a microstructure composed entirely of tempered martensite and having a hardness of 57.0 HRC.

A shear provided with blades made from this specific steel was used for shearing round rolled bars, at the exit thereof from the quenching and tempering machine provided in the rolling mill, said bars being at a temperature of about 600-650° C.

The results relating to the number of tons of bars sheared, before blade replacement became necessary, are given in the table below in relation to the significant diameter of rolled bars (in millimeters) and compared with the number of tons of bars sheared with a blade made of steel 40NiCrMoV16, belonging to the family of tool steels for hot shearing.

| DIAMETER OF BAR SHEARED | | 12 mm | 14 mm |
|---|---|---|---|
| TONS SHEARED | blade made of 40NiCrMoV16 (typical material) | 4664 ton | 0 ton |
| | shear blade of the invention | 15357 ton | 3493 ton |
| | IMPROVEMENT | +404% | |

Based on the above examples, performing a quantitative analysis that takes into account the reduction in costs for blade changing and the price difference of said blades relative to the solutions currently used, it should be noted that for diameters of 12-14 mm the saving is quantifiable in the order of 60-65%. This evaluation does not take into account the lost production due to blade changing outside of the scheduled stops, which can also be quantified at several hundred thousand euros.

The invention claimed is:

1. Shear for rolling mill having at least one blade made of steel whose chemical composition, in mass percentage, consists of 0.45-0.55% carbon, 0.10-0.30% silicon, 0.20-0.50% manganese, 4.00-5.50% chromium, 2.00-3.00% molybdenum, 0.45-0.65% vanadium and the remainder being iron and inevitable impurities, and whose microstructure is composed of tempered martensite.

2. A method comprising arranging a shear in a rolling mill, wherein said shear is arranged downstream of a quenching and tempering machine and upstream of a cooling plate, said shear having at least one blade made of steel whose chemical composition, in mass percentage, consists of 0.45-0.55% carbon, 0.10-0.30% silicon, 0.20-0.50% manganese, 4.00-5.50% chromium, 2.00-3.00% molybdenum, 0.45-0.65% vanadium and the remainder being iron and inevitable impurities, and whose microstructure is composed of tempered martensite.

3. A method according to claim 2, wherein said shear is arranged downstream of the quenching and tempering machine without further intermediate devices between said quenching and tempering machine and said shear.

4. A production process for producing at least one blade of a shear, comprising the following steps:

providing a first steel ingot whose chemical composition, in mass percentage, consists of 0.45-0.55% carbon, 0.10-0.30% silicon, 0.20-0.50% manganese, 4.00-5.50% chromium, 2.00-3.00% molybdenum, 0.45-0.65% vanadium and the remainder being iron and inevitable impurities;

electro-slag remelting said first ingot and obtaining a second newly solidified ingot;

rolling said second ingot until obtaining a blade blank having a predetermined shape;

providing a quenching cycle consisting of heating the blade to a steel austenitizing temperature between 1035° C. and 1055° C., by means of two preheating steps at intermediate temperatures respectively equal to 590-610° C. and 840-860° C., and then cooling the blade under vacuum to ambient temperature;

providing three tempering cycles at temperatures between 510° C. and 550° C., whereby said at least one blade is made of steel whose chemical composition, in mass percentage, consists of 0.45-0.55% carbon, 0.10-0.30% silicon, 0.20-0.50% manganese, 4.00-5.50% chromium, 2.00-3.00% molybdenum, 0.45-0.65% vanadium and the remainder being iron and inevitable impurities, and whose microstructure is composed of tempered martensite.

* * * * *